(12) United States Patent
Leobandung

(10) Patent No.: US 12,333,229 B2
(45) Date of Patent: Jun. 17, 2025

(54) LOGIC CIRCUIT LOCKING WITH SELF-DESTRUCT

(71) Applicant: International Business Machines Corporation, Armonk, NY (US)

(72) Inventor: Effendi Leobandung, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 17/524,103

(22) Filed: Nov. 11, 2021

(65) Prior Publication Data

US 2023/0144019 A1   May 11, 2023

(51) Int. Cl.
*G06F 30/33* (2020.01)

(52) U.S. Cl.
CPC .................... *G06F 30/33* (2020.01)

(58) Field of Classification Search
CPC .......... G06F 30/31; G06F 30/32; G06F 30/33; G06F 30/34; G06F 30/3323; G06F 30/343; G06F 21/73; G06F 21/75
USPC ......................................................... 716/106
See application file for complete search history.

(56) References Cited

U.S. PATENT DOCUMENTS

| | | | |
|---|---|---|---|
| 7,442,583 B2 | 10/2008 | Bonaccio | |
| 9,299,451 B2 | 3/2016 | Hebig | |
| 10,331,575 B2 | 6/2019 | Jang | |
| 10,387,333 B2 | 8/2019 | Chun | |
| 2006/0052962 A1* | 3/2006 | Shipton | B41J 2/04586 |
| | | | 702/106 |

FOREIGN PATENT DOCUMENTS

WO   2009085363 A2   7/2009
WO   2010011399 A2   1/2010

OTHER PUBLICATIONS

"Efuse-Based IC Security Scheme," An IP.com Prior Art Database Technical Disclosure, Original Publication Date: Aug. 21, 2006, IP.com No. IPCOM000139312D, 4 pages.
Yasin et al., "Evolution of Logic Locking", 2017 IFIP/IEEE International Conference on Very Large Scale Integration (VLSI-SoC), Oct. 23-25, 2017, 6 pages.

* cited by examiner

*Primary Examiner* — Paul Dinh
(74) *Attorney, Agent, or Firm* — Monchai Chuaychoo

(57) ABSTRACT

An approach for validating a logic key in an IC (integrated circuit) is disclosed. One approach includes an IC comprising of key input circuit couple to a fuse check circuit; charge pump circuit coupled to the fuse check circuit and a switch matrix; and one or more antifuse circuit connected to the switch matrix. Another approach comprises of a method including, inputting a secret key by a user; determining status of one or more antifuse circuit; validating the secret key; in responsive to the secret key not matching an original secret key, determining whether antifuse threshold has been reached; in responsive to determining that the antifuse threshold has been reached, disabling the IC; in responsive to the secret key matching the original secret key, enabling the IC; and in responsive to determining that the antifuse threshold has not been reached, activating the antifuse circuit.

15 Claims, 4 Drawing Sheets

- Unblown fuse $V_{out}$ will be "0" independent of $V_{in}$
- To blow a fuse, switch $V_{in}$ to high voltage charge pump for shorter period
- Fuse is blown
- To read, apply "1" to $V_{in}$ (VDD), for blown FETs, $V_{out}$ will be "1" (high)
- Differential read can also be applied to make the reading more accurate

*Anti-fuse circuit*

LOGIC CIRCUIT LOCKING WITH SELF-DESTRUCT

BACKGROUND

The present invention relates generally to the field of IC (integrated circuit) design, and more particularly to protecting the confidentiality of the IC design by utilizing logic locking.

Logic locking performs manipulations on IC designs by binding the correct functionality of a hardware design to a secret key. The owner (i.e., legitimate/legal owner) only knows that secret key. Thus, both the original functionality and the structure of the design remain hidden while it has been passed from the IC designer to the chip producer (i.e., foundry).

The main principles of how logic locking works lies in the functional and structural manipulation of a hardware design. If the correct key is provided, the locked IC design will function as intended for all input patterns. Otherwise, an incorrect key will produce an incorrect output for, at least some of those input patterns.

Although, logic locking can be performed on different design levels, the most common is deployed on a gate-level netlist through the insertion of additional gates (i.e., as key gates) or more complex structures.

SUMMARY

Aspects of the present invention disclose one or more structures for validating logic key in an IC (integrated circuit). The first structure comprises of key input circuit couple to a fuse check circuit; charge pump circuit coupled to the fuse check circuit and a switch matrix; and one or more antifuse circuit connected to the switch matrix.

Other aspects of the present invention disclosed a method for validating logic key in an IC (integrated circuit). The method comprises of inputting a secret key by a user into the IC; determining status of one or more antifuse circuit; validating the secret key; in responsive to the secret key not matching an original secret key, determining whether antifuse threshold has been reached; in responsive to determining that the antifuse threshold has been reached, disabling the IC; in responsive to the secret key matching the original secret key, enabling the IC; and in responsive to determining that the antifuse threshold has not been reached, activating the one or more antifuse circuit.

BRIEF DESCRIPTION OF THE DRAWINGS

Preferred embodiments of the present invention will now be described, by way of example only, with reference to the following drawings, in which.

DETAILED DESCRIPTION

Figure 1:
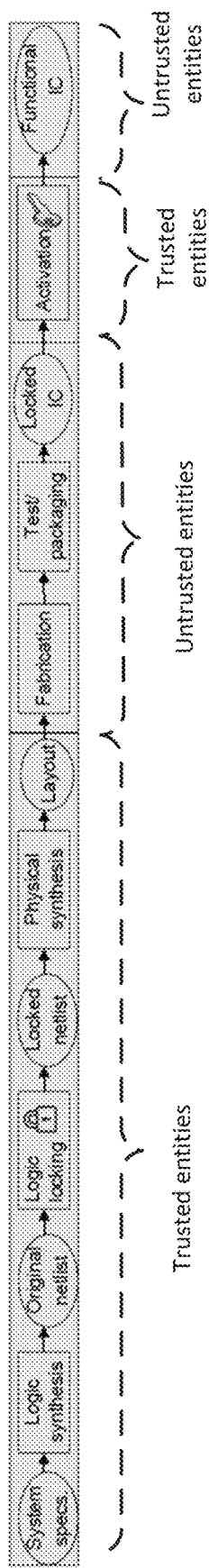
FIG. 1 illustrates a locking and activation of an IC in IC design flow as part of the current technology.

The current state of art as it pertains IC (integrated circuit) design, specifically with protecting the confidentiality of the IC design by utilizing logic locking can present some challenges. For example, there are techniques that requires an insertion of various logic gate with "key" that prevent the design/ICs to be functional without the correct key. However, this technique can be broken with multiple tries or brute force. To prevent that significant number of locks (i.e., attempts) has to be inserted which increase cost and complexity in design effort.

Embodiments of the present invention recognizes the deficiencies in the current state of art as it relates to logic locking and provides an approach for logic locking with a self-destruct circuit. The approach can limit a number of attempts to a customized number of tries before the circuit will self-destruct. One advantage with the approach relates to simplification and reduction the number of keys to lock the circuit. For example, embodiment comprises of a function locking circuit, where there is a limit of number of incorrect attempts. Every incorrect try will blow a fuse (as part of the circuit). Once enough fuse is blown, the IC chip will no longer function even with correct key (since too many failed attempts has been reached).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 illustrates a locking and activation of an IC in IC design flow as part of the current technology. The locked netlist must pass through the untrusted fabrication, manufacturing, and test phases (designated as untrusted entities). Without the secret key, (1) the design details cannot be recovered (through the use of reverse engineering) and (2) the IC is not functional (i.e., it produces incorrect outputs (for over-production)). Thus, a locked IC needs to be activated by loading the secret key onto the chip's memory.

Figure 2:
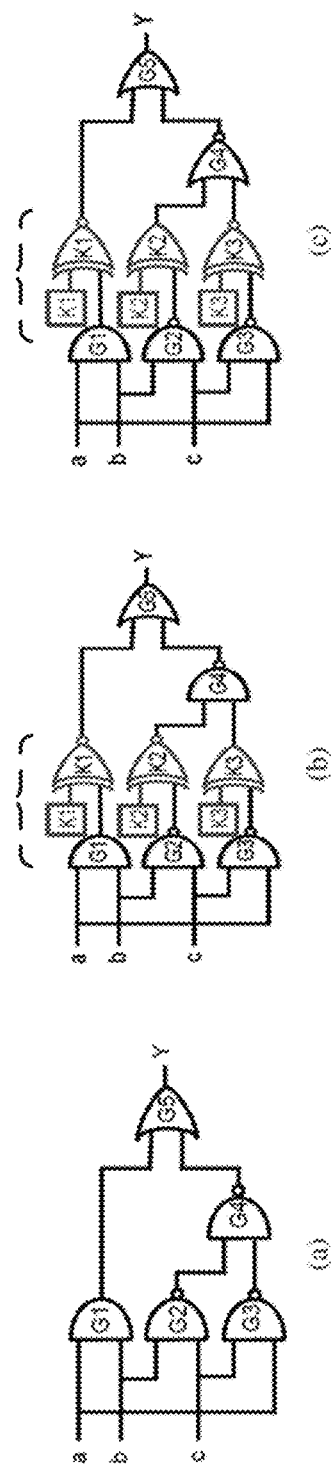
FIG. 2 illustrates a logic locking using XOR/XNOR gates as part of the current technology.

FIG. 2 illustrates a logic locking using XOR/XNOR gates as part of the current technology. For example, FIG. 2(a) presents an example (i.e., majority circuit) netlist, and FIG. 2(b) shows the locked version with three XOR/XNOR key gates. One input of each key gate is driven by a wire from the original design, while the other input, referred to as key input, can be driven by a key bit stored in a tamper-proof memory. To increase the obfuscation complexity, inverters can be added to or removed from the netlist. FIG. 2(c) illustrates further complexity by bubble shifting the inverters in the netlist to de-couple the key value (i.e., 0/1) from the key gate type (i.e., XOR/XNOR). The locked IC (or a locked netlist) will not generate correct output unless it is activated using the correct key.

Figure 3:
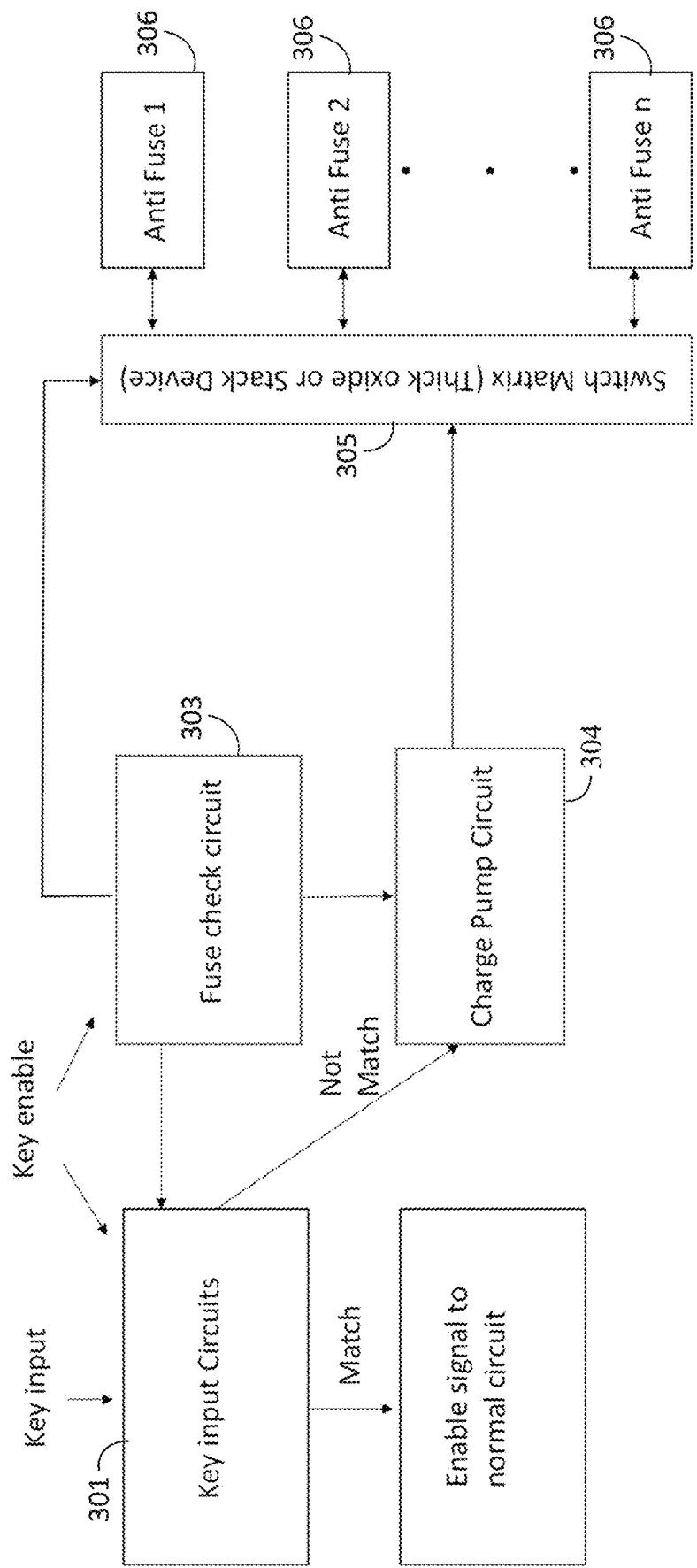
FIG. 3 illustrates a block diagram of logic lock, designated as 300, in accordance with one embodiment of the present invention.

FIG. 3 illustrates a block diagram of logic lock, designated as 300, in accordance with one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Logic lock 300 includes key input circuits 301, fuse check circuit 303, charge pump circuit 304, switch matrix 305 and anti-fuse circuit 306. While this embodiment describe using anti-fuse circuit, it is also possible to use fuse circuit. It is noted that "anti-fuse" may be written as "anti fuse" or "antifuse" but denotes the same terminology.

Key input circuits 301 performs a primary function for logic locking. Key input circuits 301 may leverage existing technology of logic locking (see FIG. 1 and FIG. 2) as an implementation method. Key input circuits 301 may allow for insertion of additional logic into an existing circuit (to be protected), locking the original design with a secret key.

Fuse check circuit 303 functions as a mechanism for checking if any or how many anti-fuse circuit 306 has blown. Fuse check circuit can be implemented with existing technology, such as a comparator circuit coupled with a counter. A comparator circuit compares at least two voltages and outputs. The values of the voltage and/or outputs can be either a 1 (the voltage at the plus side) or a 0 (the voltage at the negative side) to indicate which is larger. Typically, comparator circuits are often used, to check whether an input has reached some predetermined value.

A counter is a logic device capable of incrementing values based on an event occurrence. The purpose of the counter is increment one value from the preceding value by one whenever one antifuse has blown. An antifuse threshold is an internal value that an IC designer assigned based on the number of antifuse circuits being employed in the IC. For example, an IC design with a maximum of three attempts to unlock will have three antifuse circuit. The counter will increment accordingly to the number of blown antifuse. Thus, after three attempts, all three antifuse have blown and the value in the counter is three.

Charge pump circuit 304 functions as a mechanism for increasing an incoming voltage to a higher voltage. Charge pump circuit 304 can be implemented with existing technology, such as a voltage doubler. Voltage doublers utilize capacitors to achieve higher voltages.

Switch matrix 305 performs a function of selecting/connecting one or more anti-fuse circuit 306 to be blown in the circuit (i.e., incorrect secrete key in the input). Switch matrix 305 can be implemented with existing technology, such as a matrix (flexible switching configurations) instead of a multiplexer. A matrix can connect multiple inputs to multiple outputs organized as columns and rows.

Anti-fuse circuit 306 functions as a mechanism for disabling an IC chip based on unsuccessful attempts by an incorrect secret key. Anti-fuse circuit 306 can be implemented with existing technology, such as an antifuse. An antifuse is an electrical device that performs the opposite function to a typical fuse. For example, a fuse begins with a low resistance and is designed to permanently break an electrically conductive path whenever a current exceeds a specified limit. However, an antifuse begins with a high resistance, and based on the user's programming, it converts it into a permanent electrically conductive path whenever the voltage across the antifuse exceeds a certain level (see FIG. 4).

Figure 4:
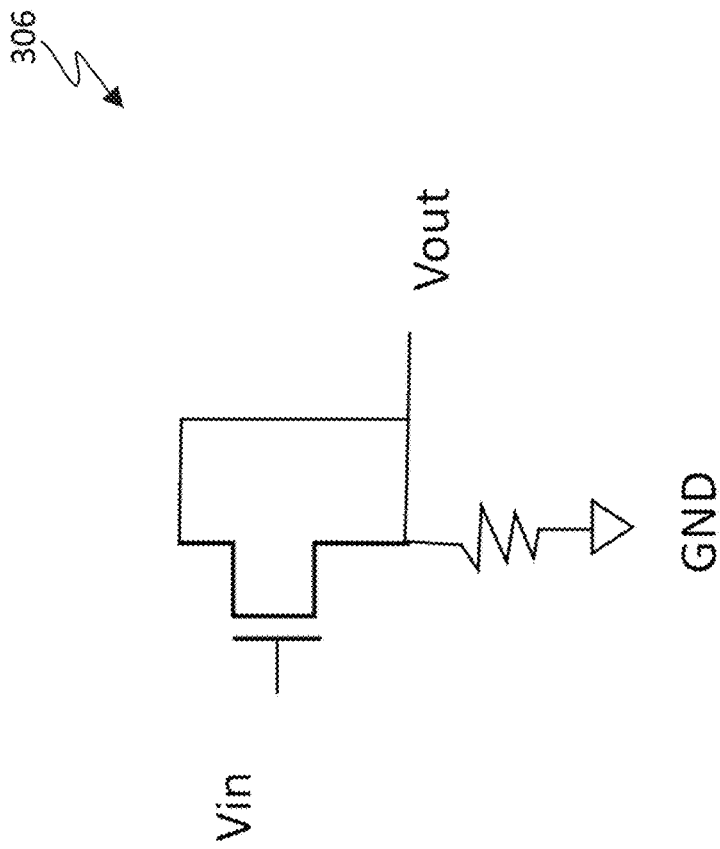
FIG. 4 illustrates the operation of an anti-fuse 205 in greater details.

FIG. 4 illustrates the operation of an anti-fuse 205 in greater details. It is noted that the designer of the IC circuit can determine the number of the antifuse circuit with just one or five (e.g., 0 to n), based on the requirements/needs of the designer. It is noted that anti-fuse circuit 306 can be made from normal (thin) oxide. Furthermore, differential read can also be applied to make the reading (from the antifuse circuit) more accurate.

Figure 5:
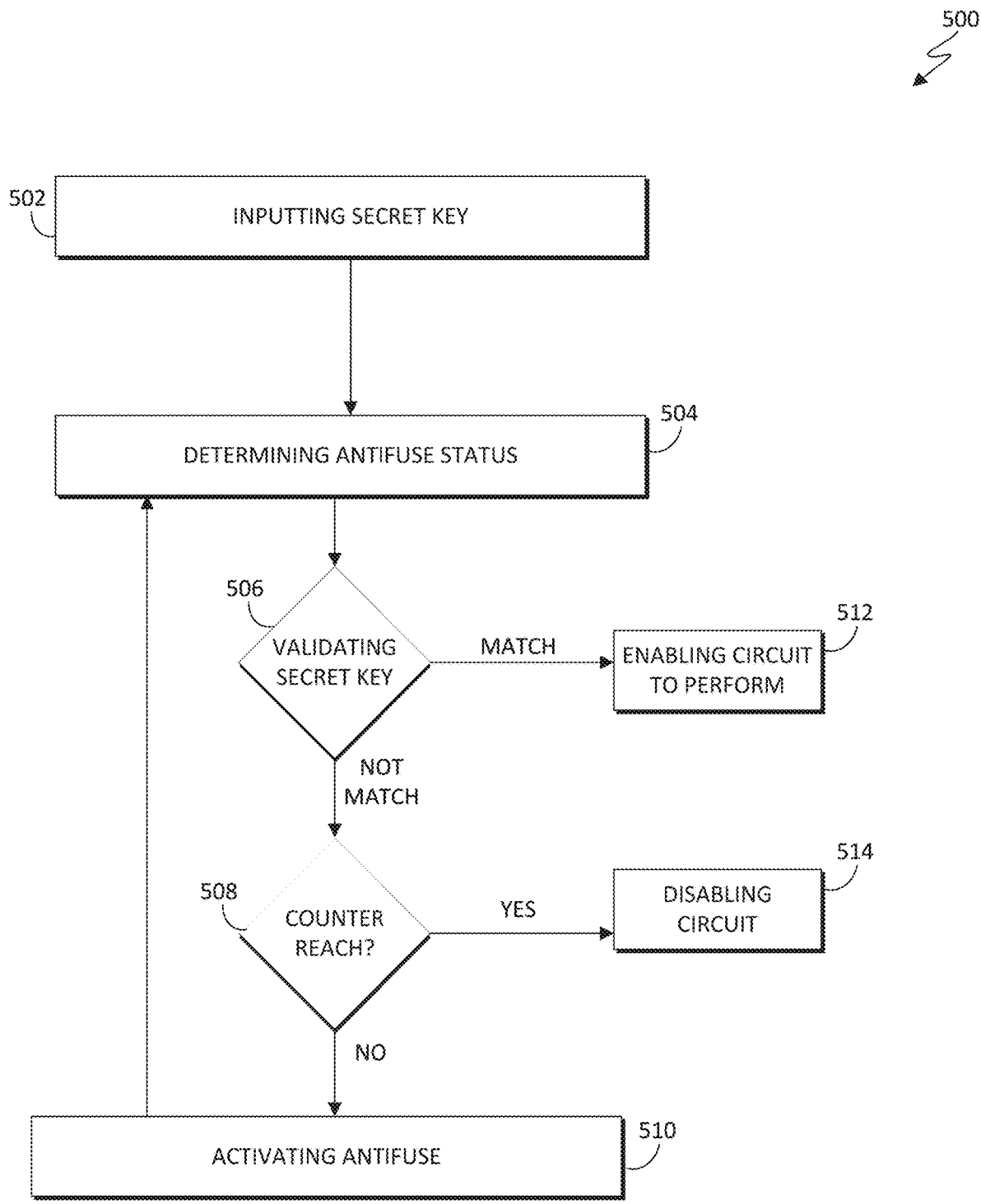
FIG. 5 is a high-level flow chart illustrating logic lock 500, in accordance with another embodiment of the present invention.

FIG. 5 is a high-level flow chart illustrating logic lock 500, in accordance with another embodiment of the present invention.

Prior to step 502, the IC chip power is turned on. In step 502, the user is inputting, through key input circuit, the secret key (hopefully the correct key). In step 504, logic lock 300, through fuse check circuits 303, determines if antifuse 0 through n has been blown. Assuming that not all of the antifuse has "blown" (based on a counter from fuse check circuit 303), the nest step is validating the secret key (decision block 506).

In decision block 506, the secret key (from the user) is validated/check to see if it is the correct key to enable the circuit. If the secret key is the correct key ("MATCH" branch of decision block 506) then the IC circuit is enabled to perform normal functions 512 (as it was intended). However, if the secret key is NOT the correct key ("NOT MATCH" branch of decision block 506) then embodiment proceeds to check the counter 508 (for the antifuse). The counter, through fuse check circuit 303, checks to see if all of the antifuse has blown. If all of the antifuse has been blown (i.e., counter reached the predetermined antifuse threshold) then the IC circuit is disabled to perform any normal functions (step 514). However, if counter (i.e., remaining antifuse circuit has not blown) does not reach predetermined antifuse threshold then charge pump circuit 304, activates (step 510) the remaining antifuse circuit 306.

After step 510, logic lock 300 returns to step 504 to determine how many antifuse circuit 306 has not blown (i.e., check the counter). The steps are repeated until either (i) the IC chip is enabled or (ii) IC is disabled (based on too many failed attempt with the wrong secret key).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the proposed concept may be summarized in a nutshell in the following clauses:
1) User input keys into appropriate I/O
2) User enable "check key" signal through I/O
3) Chip check if Fuse (i.e., antifuse) 0, 1, 2 . . . n has been blown:
   a) Set switching matrix to Fuse that has not been blown
   b) If all fuses have been blown, send signal to "Key input Circuit" to terminate check which disable proper chip operation
4) Key input circuit check if key match the desired key (can be internal, external, hash key etc.)
   a) If key match desired key, then distribute key into the chips and chip will function normally
   b) If key does not match desired key:
      i) Enable Charge Pump to send signal to switching matrix which will send high voltage to fuse to blow the next fuse that has not been blown
      ii) Do not send key to enable proper chip operation
5) Key input circuit check if key match the desired key (can be internal, external, hash key etc.)
6) If key match desired key, then distribute key into the chips and chip will function normally
7) If key does not match desired key:
8) Enable Charge Pump to send signal to switching matrix which will send high voltage to fuse to blow the next fuse that has not been blown
9) Do not send key to enable proper chip operation

What is claimed is:

1. An integrated circuit for validating logic key, the integrated circuit (IC) comprising:
   key input circuit couple to a fuse check circuit, wherein the key input circuit includes at least, a plurality of XOR and XNOR logic gates and the key input circuit is for performing the steps of:
      receiving a secret key from a user into the IC;
      determining status of one or more antifuse circuit;
      validating the secret key;
      in responsive to the secret key not matching an original secret key, determining whether an antifuse threshold has been reached;
      in responsive to determining that the antifuse threshold has been reached, disabling the IC, wherein disabling the IC based on unsuccessful attempts by an incorrect secret key;
      in responsive to the secret key matching the original secret key, enabling the IC; and
      in responsive to determining that the antifuse threshold has not been reached, activating the one or more antifuse circuit;
   charge pump circuit coupled to the fuse check circuit and a switch matrix, wherein the fuse check circuit is a comparator circuit and the charge pump circuit is a voltage doubler circuit; and
   the one or more antifuse circuit connected to the switch matrix.

2. The integrated circuit of claim 1, wherein the fuse check circuit is configured to determine antifuse threshold.

3. The integrated circuit of claim 1, wherein the charge pump circuit configured to increase an activate antifuse signal.

4. The integrated circuit of claim 3, wherein the switch matrix is configured to activate the one or more antifuse circuit based on the activate antifuse signal.

5. The integrated circuit of claim 1, wherein the switch matrix is a matrix circuit.

6. The integrated circuit of claim 1, wherein the one or more antifuse circuit is made from thin oxide.

7. A method for validating logic key in an IC (integrated circuit), the method comprising:
   key input circuit couple to a fuse check circuit, wherein the key input circuit includes at least, a plurality of XOR and XNOR logic gates and the key input circuit is for performing the steps of:
      receiving a secret key from a user into the IC;
      determining status of one or more antifuse circuit;
      validating the secret key;
      in responsive to the secret key not matching an original secret key, determining whether an antifuse threshold has been reached;
      in responsive to determining that the antifuse threshold has been reached, disabling the IC, wherein disabling the IC based on unsuccessful attempts by an incorrect secret key;
      in responsive to the secret key matching the original secret key, enabling the IC; and
      in responsive to determining that the antifuse threshold has not been reached, activating the one or more antifuse circuit;
   charge pump circuit coupled to the fuse check circuit and a switch matrix, wherein the fuse check circuit is a comparator circuit and the charge pump circuit is a voltage doubler circuit; and
   the one or more antifuse circuit connected to the switch matrix.

8. The method of claim 7, wherein determining status of one or more antifuse circuit further comprising:
   determining, by fuse check circuit, the antifuse threshold.

9. The method of claim 7, wherein validating the secret key further comprising:
   determining, by the key input circuit, whether the secret key from the user matches the original secret key.

10. The method of claim 7, wherein determining whether antifuse threshold has been reached further comprising:
    comparing, by the fuse check circuit, whether a counter value exceed the antifuse threshold.

11. The method of claim 7, wherein the antifuse threshold is a total number of antifuse circuit in the IC.

12. The method of claim 7, wherein activating the one or more antifuse circuit further comprising:
   incrementing a counter; and
   blowing, by a charge pump circuit and switch matrix, a remaining antifuse of the one or more antifuse circuit.

13. The method of claim 12, wherein switch matrix is a matrix.

14. The method of claim 7, wherein one or more antifuse circuit is made from a thin oxide.

15. The method of claim 7, wherein enabling the IC is allowing the IC to function normally.

\* \* \* \* \*